(12) United States Patent
Petel

(10) Patent No.: US 10,548,014 B2
(45) Date of Patent: Jan. 28, 2020

(54) METHOD FOR AUTOMATIC RECOGNITION BETWEEN A MOBILE DEVICE AND A MOTOR VEHICLE, CAPABLE OF FUNCTIONING ACCORDING TO THE BLE PROTOCOL

(71) Applicant: VALEO COMFORT AND DRIVING ASSISTANCE, Créteil (FR)

(72) Inventor: Laurent Petel, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 323 days.

(21) Appl. No.: 15/532,384

(22) PCT Filed: Dec. 22, 2015

(86) PCT No.: PCT/FR2015/053717
§ 371 (c)(1),
(2) Date: Jun. 1, 2017

(87) PCT Pub. No.: WO2016/102887
PCT Pub. Date: Jun. 30, 2016

(65) Prior Publication Data
US 2017/0347266 A1 Nov. 30, 2017

(51) Int. Cl.
*H04W 12/06* (2009.01)
*H04L 9/32* (2006.01)
(Continued)

(52) U.S. Cl.
CPC .......... *H04W 12/08* (2013.01); *B60R 25/241* (2013.01); *H04L 9/0643* (2013.01);
(Continued)

(58) Field of Classification Search
CPC ... H04W 12/003; H04W 12/06; H04W 12/08; H04W 4/40; H04W 4/80; H04L 9/0643;
(Continued)

(56) References Cited

U.S. PATENT DOCUMENTS 7,366,677 B1 4/2008 Liu et al.
2009/0251279 A1 10/2009 Spangenberg et al.
(Continued)

FOREIGN PATENT DOCUMENTS

| EP | 0 492 692 A2 | 7/1992 |
|---|---|---|
| FR | 2 774 833 A1 | 8/1999 |
| WO | 2008/063899 A2 | 5/2008 |

OTHER PUBLICATIONS

International Search Report issued in PCT/FR2015/053717 dated Mar. 30, 2016 (4 pages).
(Continued)

*Primary Examiner* — Minh Dinh
(74) *Attorney, Agent, or Firm* — Osha Liang LLP

(57) ABSTRACT

The invention relates to a method for automatic recognition between a mobile electronic device (SP) and a motor vehicle (Vi) equipped with an electronic communication module (120), said mobile electronic device (SP) and the electronic module (120) of the vehicle (Vi) being capable of operating according to the BLE protocol, the mobile electronic device (SP) being in a "scanning" mode and the electronic communication module (120) of the vehicle (Vi) being in an "advertising" mode characterised in that it comprises various steps consisting of: —in the electronic module (120) of the vehicle (Vi), obtaining identification data (RPAi) of the vehicle (Vi); —transmitting at least one data frame (Td) comprising the identification data (RPAi) of the vehicle (Vi), from the electronic module (120) of the vehicle (Vi) to the mobile electronic device (SP); —receiving the at least one data frame (Td) containing the identification data (RPAi) of the vehicle (Vi), in the mobile electronic device (SP) set in "scanning" mode; —checking, in the mobile electronic device (SP), that the transmitted identification data (RPAi) is valid, then transmitting a connection request (110) from the (Continued)

mobile electronic device (SP) to the electronic module (120) of the vehicle (Vi).

9 Claims, 1 Drawing Sheet

(51) Int. Cl.
*H04W 12/08* (2009.01)
*H04W 4/40* (2018.01)
*B60R 25/24* (2013.01)
*H04L 9/06* (2006.01)
*H04W 4/80* (2018.01)
*H04L 29/08* (2006.01)
*H04L 29/06* (2006.01)

(52) U.S. Cl.
CPC .......... *H04L 9/3228* (2013.01); *H04L 9/3271* (2013.01); *H04W 4/40* (2018.02); *H04W 12/06* (2013.01); *B60R 2325/205* (2013.01); *H04L 63/068* (2013.01); *H04L 67/125* (2013.01); *H04L 2209/80* (2013.01); *H04L 2209/84* (2013.01); *H04W 4/80* (2018.02)

(58) Field of Classification Search
CPC ....... H04L 9/0866; H04L 9/32; H04L 9/3228; H04L 9/3234; H04L 9/3239; H04L 9/3271; H04L 2209/80; H04L 2209/84; G07C 9/00309; G07C 9/00571; G07C 2009/00412; G07C 2009/00865
See application file for complete search history.

(56) References Cited

U.S. PATENT DOCUMENTS

2014/0169564 A1  6/2014  Gautama et al.
2014/0188348 A1  7/2014  Gautama et al.
2014/0282974 A1  9/2014  Maher et al.

OTHER PUBLICATIONS

Written Opinion of the International Searching Authority issued in PCT/FR2015/053717 dated Mar. 30, 2016 (8 pages).

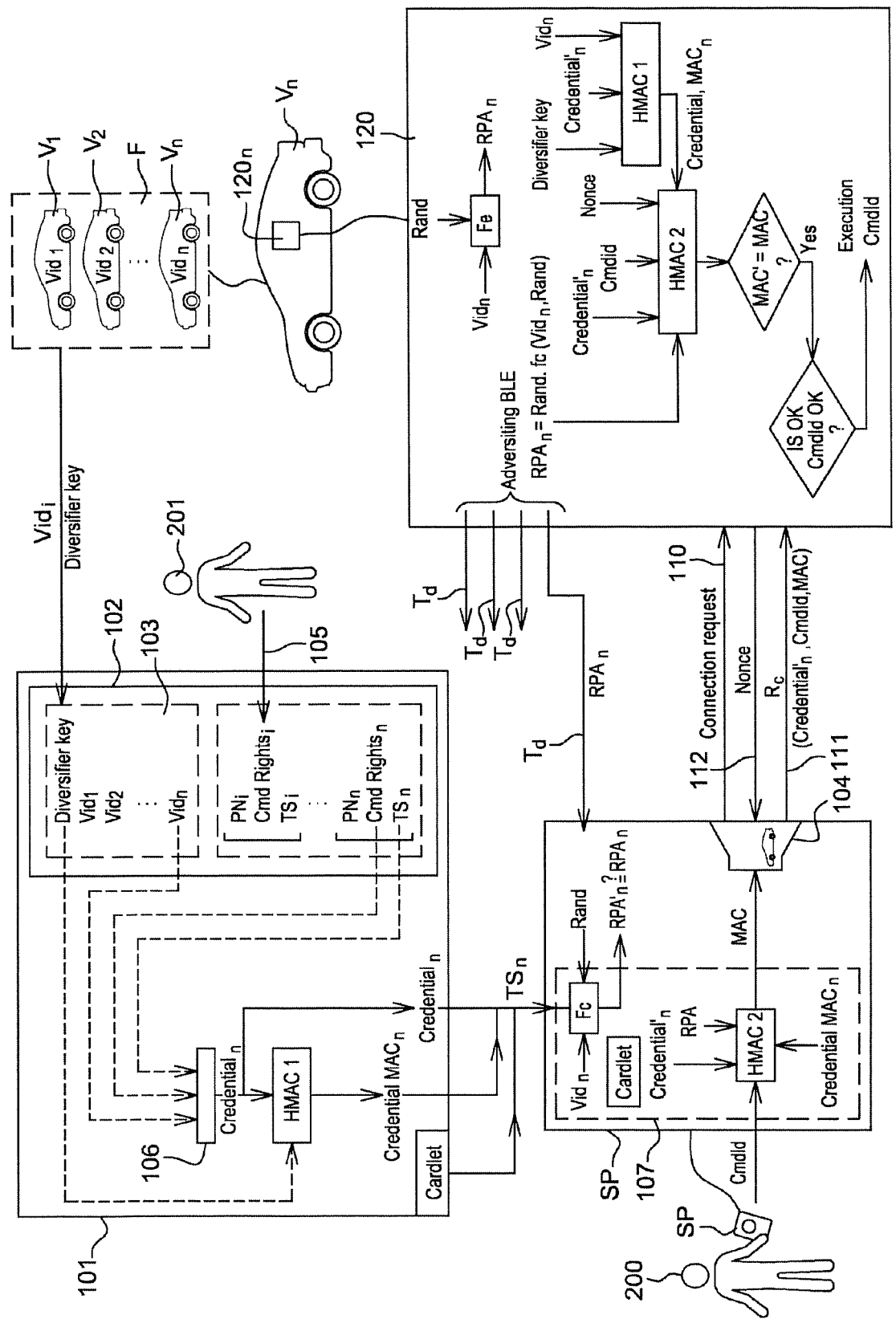

METHOD FOR AUTOMATIC RECOGNITION BETWEEN A MOBILE DEVICE AND A MOTOR VEHICLE, CAPABLE OF FUNCTIONING ACCORDING TO THE BLE PROTOCOL

TECHNICAL FIELD OF THE INVENTION

The present invention relates to a method for automatic recognition between an electronic mobile communication device and an electronic module of a motor vehicle, said mobile communication device and said electronic module of the motor vehicle being capable of exchanging signals according to the Bluetooth Smart or Bluetooth Low Energy (BLE) protocol. The technical field of the invention is that of accessing motor vehicles by means other than the use of mechanical keys.

In the context of the present document, the expression "electronic mobile communication device" is taken to mean any electronic device enabling a person to access data and information via at least one telecommunication network (of the GSM or Bluetooth type, for example). Thus the term "mobile communication devices" comprises cellphones, more particularly those of the smartphone type, portable computers, tablets, personal digital assistants (PDAs), and the like. In the present document, by way of non-limiting example, the mobile communication device is a smartphone in the various situations described. The term "motor vehicle" will be used to stand for the electronic module that it contains, although this is an inaccurate use of language. The term "hirer" will be taken to mean a person who will hire or borrow, or who does hire or borrow, a vehicle. In the context of the present invention, the user is necessarily equipped with a mobile communication device, notably of the smartphone type.

PRIOR ART

At the present time, a user is able to control the execution of a function—or command—of a vehicle by following a procedure of secure exchanges by means of a dedicated application, using a mobile communication device, for example a smartphone. The function—or command—in question is, for example, one of the following commands: locking/unlocking the vehicle, starting the vehicle, automatic parking, etc. In some applications, in order to be able to execute one of these commands, the mobile device must have previously stored an identification key authorizing the execution of at least one command of the vehicle. The identification key may be stored in a secure element of the smartphone, for example its SIM card or any other secure element. By keeping the smartphone with him, the user can thus, for example, unlock the lock of an openable body section of the vehicle. For this purpose, data, notably authentication data contained in the identification key, and therefore in the smartphone, are exchanged between said smartphone and an electronic module of the vehicle, which determines whether the vehicle's identification key is valid. In advantageous embodiments, these data exchanges are carried out in accordance with the BLE protocol.

If the vehicle is shared by a plurality of users, the identification key stored in the user's smartphone is an identification key which, in a certain configuration, may be temporary; that is to say, it is valid only for a limited period of time. The information concerning the validity period is advantageously contained in the code forming the temporary identification key. In the case of a vehicle for use, the period of validity of the temporary identification key then corresponds to the period of use of the vehicle. The temporary identification key is obtained after the user has performed all the operations necessary for the use of the vehicle (reservation, payment, etc.). In all cases, the identification key may be, for example, transferred according to the BLE protocol, but also by NFC, Wi-Fi or via an electronic optical device, for example by means of the camera of the smartphone which captures the image of a code (QR or barcode), from an automatic terminal placed in the proximity of the vehicle for hire to the smartphone, or may be sent via a mobile communications network of the GSM type from a remote server to the smartphone.

In the context in which the exchanges between the smartphone and the motor vehicle take place according to the BLE protocol, the motor vehicle is put into advertising mode for long periods, or even permanently. Advertising mode is a mode of the BLE protocol in which the vehicle regularly transmits messages for the purpose of signaling its presence, and possibly communicating certain information. The information that is communicated is, for example, an indication that it provides the service used by the dedicated application.

In the prior art, the vehicle must have been paired with the smartphone in advance to enable it to receive and act on the instructions sent by the smartphone SP via the dedicated application.

For its part, the smartphone is put into the "scanning" mode of the BLE protocol: the scanning mode is a mode of the BLE protocol which enables it to listen to messages sent according to this protocol. The dedicated application can thus retrieve all the signals sent by different vehicles in advertising mode, said signals indicating, notably, that they are capable of receiving commands sent by the dedicated application.

Thus the dedicated application may be used to obtain a list of vehicles which are located within BLE range of the smartphone, and which have indicated in their advertising frame that they are capable of receiving commands from the dedicated application installed in the smartphone. However, the smartphone user only has the right to use one, or possibly a certain number, of the vehicles from this list of vehicles. In order to determine which vehicle to use, from among the vehicles to which he obtained the rights, he selects said vehicle and enters a code, called a pairing code, which is specific to the vehicle concerned. The pairing code has been sent to him in advance provided that he has received the rights to use the vehicle concerned. The pairing code is most commonly a code which is entered into the smartphone during the authentication phase for the purposes of pairing. In an alternative procedure, this pairing code may be received by the smartphone by NFC or via the camera (using a QR code or barcode). The smartphone and the vehicle are then paired. Clearly, if the user enters a pairing code which is not the code expected by the vehicle, pairing does not take place.

When the smartphone and the vehicle have been paired, they may exchange signals, for example in the form of requests, challenges, and/or responses in a secure form. This is because, advantageously, during the pairing operation, encryption keys have been exchanged between the vehicle and the smartphone, enabling the exchanged signals to be encrypted and/or decrypted. In another operating mode, the vehicle accepts commands received from a smartphone only if these two devices have been paired in advance.

The mechanism of pairing between a smartphone and a vehicle is advantageous in that it secures the exchanges between these two devices. However, it is constraining, since it requires the user of the smartphone:

- To identify the vehicle to which he has a right from among a list of vehicles offered to him by his dedicated application. Since the list of vehicles is made up of all the vehicles near the smartphone that are capable of receiving commands from the dedicated application, said list may be long, for example where the user is located at an agency for the use of vehicles. In this case, it is not a straightforward matter for the user to identify the vehicle intended for him.
- To have previously obtained the pairing code associated with the vehicle to which he has a right. This code must have been sent to him, usually by a third party. He must then memorize it, or note it, and retain it until he gains access to the vehicle to which he has a right.
- To enter the pairing code into the dedicated application installed in his smartphone.

The pairing mechanism is even more constraining because it may be repeated several times, depending on the conditions of use of the vehicle.

SUMMARY OF THE INVENTION

The invention is intended to overcome some or all of the drawbacks of the prior art identified above, and notably to propose a method for automatic recognition between a mobile communication device, such as a smartphone, and a motor vehicle, by means of signals exchanged according to the BLE protocol, said method of authentication no longer requiring the use of the pairing mechanism, but nevertheless providing optimal security for the exchanges between the vehicle and the mobile apparatus.

To this end, it is proposed in the invention, notably, that frames comprising authentication information be transmitted from the vehicle V in an advertising mode of the BLE protocol, these frames being recognized by the smartphone and by it alone.

Thus the present invention essentially relates to a method for automatic recognition between a mobile electronic device and a motor vehicle equipped with an electronic communication module, said mobile electronic device and the electronic module of the motor vehicle being capable of operating according to the BLE protocol, the mobile electronic device being in a scanning mode and the vehicle's electronic communication device being in an advertising mode, characterized in that it comprises the following different steps:

- In the electronic module of the vehicle, obtaining a vehicle identification data element;
- Sending at least one frame of data, comprising the vehicle identification data element, from the electronic module of the vehicle to the mobile electronic device;
- Receiving, in the mobile electronic device which has been put into scanning mode, at least one data frame containing the vehicle identification data element;
- Verifying, in the mobile electronic device, that the transmitted identification data element is valid, and then sending a connection request from the mobile electronic device to the electronic module of the vehicle.

In addition to the main characteristics mentioned in the preceding paragraph, the method according to the invention may have one or more supplementary characteristics from among the following, considered individually or in all technically possible combinations:

the identification data element of the vehicle is written according to the formula:

$$RPAi = M(ASSOC)Ri,$$

where $Ri = Fc(Vidi, M, N)$
where
M and N are variable data elements, of m and n bits respectively (m and
n being integers or zeroes);
Fc is an encryption function;
Vidi is a secret code of the vehicle Vi; and
ASSOC is a function which associates the data with one another,
$m=n=0$; or $m=0$ and $n \neq 0$; or $m \neq 0$ and $n=0$, or $m \neq 0$ and $n \neq 0$;
the mobile electronic device calculates, on its side, an encrypted control code R'i according to the formula:

$$R'i = Fc(Vidi, M, N)$$

the step consisting in verifying in the mobile electronic device that the transmitted identification data element is valid consists in an equality comparison between Ri and R'i;
all or part of the data frame sent from the electronic module of the vehicle to the mobile electronic device is used as a challenge to which the mobile electronic device must respond in order to perform an action on the vehicle.

BRIEF DESCRIPTION OF THE DRAWINGS

Other characteristics and advantages of the invention will be apparent from a perusal of the following description, with reference to the sole attached FIGURE, FIG. 1, which shows a schematic representation of the various elements in play in an exemplary embodiment of the method according to the invention.

DETAILED DESCRIPTION OF AN EMBODIMENT

In a non-limiting embodiment of the invention, the procedure is as follows: in a first phase, for the set of vehicles Vi providing a specific service (where i varies from 1 to n, n being an integer corresponding to the number of vehicles), a remote server 101 has a confidential data set 103 relating to each vehicle Vi in a database 102. Thus the remote server 101 has, for each vehicle Vi, a first secret code Vidi specific to each vehicle Vi concerned, and a second secret code DiversifierKey, which will be used to generate a plurality of virtual keys. In a preferred alternative mode which is not represented diagrammatically, one or more different DiversifierKey code(s) is/are associated with each Vidi. The DiversifierKeys may be obtained on the basis of Vidi and/or another data element, such as an incremented data element.

In a following phase, rights for each vehicle Vi must be defined. The rights concerned for each vehicle Vi are associated, for each future user 200 equipped with a mobile communication device SP such as a smartphone, with one or more data elements from among the following:

An authorized period of use TSi for each user concerned; this period of use may be defined, for example, by an interval lying between a first and a second date, or by a date of start of use and a maximum period of use Dmax for the vehicle Vi;
A list of rights CmdRightsi; this list of rights CmdRightsi defines the actions, the commands, that each user concerned may perform on the vehicle Vi, using a dedicated application 104 of his mobile device SP. Thus, it is defined, for example, that the user 200 has the right to open all or part of the vehicle Vi (a certain number of times, for example), to start the vehicle Vi, to park the vehicle Vi, to use the vehicle subject to certain conditions (such as a speed limit, a distance traveled, or a geographic area).

To define these rights, an authorized user 201, normally the owner of the vehicle, connects to the remote server 101, advantageously by means of a secure communication 105, for example by using a password that the authorized user 201 must possess. Thus the owner 201 decides for each vehicle Vi who the authorized users will be, and what rights will be associated with each user. For this purpose, he notifies the remote server of said rights concerned for each future user, together with an identifier of each user concerned. Advantageously, the user's identifier is his cellphone number PNi. In other examples, the identifier may be the IMEI number of the cellphone, or an identification number of the SIM card (IMSI number) of the future user.

On the basis of the information entered by the owner 201 and the first secret code Vidi of the vehicle Vi, the remote server 101 uses a calculation unit 106 to generate an accreditation code Credentiali. In a non-limiting embodiment, the accreditation code Credentiali may be generated by means of the calculation unit 106, by a simple concatenation of the data mentioned above (the rights CmdRightsn of the hirer 200 concerned, the authorized period of use TSi, and the first secret code Vidi of the vehicle Vi). In an alternative mode, the Vidi is omitted from the concatenation. The accreditation code Credentiali is therefore specific to a user, to a given vehicle, and to the rights that the user has for the vehicle Vi concerned.

In one embodiment, the remote server 101 then generates, on the basis of the accreditation code Credentiali and the second secret code DiversifierKey of the vehicle Vi, by means of a first encryption module, a signature, or authentication code, CredentialMACi, which will be associated with the accreditation code Credentiali, to authenticate said accreditation code Credentiali subsequently. In an alternative embodiment, the remote server 101 generates the authentication code CredentialMACi on the basis of the second secret code DiversifierKey and the code Vidi. This encryption, HMAC1, may for example be an encryption of the type known as HMAC, for "Hashed Message Authentication Code" in English, or an encryption of the type known as AES, for "Advanced Encryption Standard". The authentication code CredentialMACi may also be used to ensure that the user 200 will be limited in his actions to the rights granted to him by his accreditation code Credentiali; it also enables the vehicle Vi to validate the user's wishes concerning the authorizations contained in the accreditation code Credentiali.

When the accreditation code Credentiali and its signature CredentialMACi have been created by the remote server 101, they are, together with the code Vidi, transferred to, and stored in, a secure area 107 of the smartphone SP of the hirer 200 associated with the virtual key CredentialMACi which has been generated specifically for this hirer 200. The secure area 107 of the smartphone may be, for example, the SIM card or any other secure element provided in the smartphone. In an alternative embodiment, the secure area 107 may be represented by a virtual secure element. This storage operation can only be performed by an operator authorized to carry out such a writing operation in the secure area. This entity is known as a TSM ("Trusted Service Manager" in English). The transfer of the virtual key and its signature is carried out by using the telephone number PNn of the user 200, this telephone number PNn having been communicated to the remote server 101 by the authorized user 201.

At the same time, a software element, called a cardlet in the case of a SIM card, is stored in the secure area 107, again by the action of the authorized operator TSM. The cardlet software element is a special application which can be used, notably, by the dedicated application to interact with the codes stored in the secure area 107, these codes being CredentialMACi, Credentiali and Vidi, without specific disclosure of the codes CredentialMACi and Vidi. For its part, the code Credentiali will be transmitted, among other codes, by the dedicated application to the vehicle. The security of the process is thus reinforced. When these different elements have been stored in the secure area 107, the smartphone SP is able to transmit commands to the vehicle Vi via the dedicated application 104.

For this purpose, according to the invention, a process is carried out in which the smartphone SP recognizes the vehicle Vi which the user 200, who is the owner of the smartphone SP, is authorized to borrow.

The various steps of this recognition process will now be detailed:

In a first step, which is repeated regularly, the vehicle Vi, or more precisely an electronic module 120 of the vehicle Vi, capable of operating according to the BLE protocol and put into advertising mode, regularly transmits a data frame Td. According to the invention, the data frame comprises an identification data element RPA which is calculated, in a first example, by an encryption Fc on the basis of the first secret code Vidi specific to the vehicle Vi; we may then write RPAi=Fc (Vidi).

In a second example, corresponding to the illustrated example, the identification data element RPAi is obtained by the association or concatenation (ASSOC) of a random data element Rand and a result Fc(Vidi, Rand) obtained by the application of the encryption function to the first secret code Vidi and to the random data element Rand; we may then write RPAi=Rand. (ASSOC) Fc(Vidi,Rand). This second example has the advantage that the value of the identification data element RPA may or may not vary from one transmission to the next, due to the variation or non-variation of the RAND from one transmission to the next, thereby making it impossible to guess what the value of the next identification data element RPA will be.

In a third exemplary embodiment, the identification data element RPAi is obtained by an encryption function Fc on the basis of the first secret code Vidi specific to the vehicle Vi and a data element DATA which is variable. We may then write RPAi=Fc(Vidi, DATA). The DATA values are known only by the vehicle Vi and the smartphone SP. The DATA values may, in a non-limiting example, be provided by a pseudorandom generator whose root value is known, or by a counter of predetermined increments, or by a clock. This second example has the advantage that the value of the identification data element RPA may or may not vary from one transmission to the next, as a result of the fact that the DATA values are or are not made to vary from one transmission to the next, thereby making it impossible to guess what the value of the next identification data element RPA will be.

In a fourth exemplary embodiment, the identification data element RPAi is obtained by the concatenation (ASSOC) of a data element DATA" and a result Fc(Vidi, DATA',DATA") obtained by the application of the encryption function to the first secret code Vidi and to the data elements DATA', DATA". We may then write RPAi=DATA" (ASSOC) Fc(Vidi, DATA', DATA"). The DATA' values are known only by the vehicle Vi and the smartphone SP. The DATA' values may, in a non-limiting example, be provided by a pseudorandom generator whose root value is known, or by a counter of predetermined increments, or by a clock.

To summarize, for all the exemplary embodiments, the identification data element RPAi may be expressed by the formula:

$$RPAi=M(ASSOC)Ri,$$

where Ri=Fc(Vidi, M, N) where m and N are variable data elements, of m and n bits respectively (m and n being integers).

Thus,
the first exemplary embodiment corresponds to the case where m=n=0
the second exemplary embodiment corresponds to the case where n=0 and m≠0
the third exemplary embodiment corresponds to the case where n≠0 and m=0
the fourth exemplary embodiment corresponds to the case where n≠0 and m≠0

In a second step, when the smartphone SP, in scanning mode, receives the data frame Td, and therefore the identification data element RPAi, it calculates, on its side, an encrypted check code R'i. This checking operation takes place in the secure area 107 by means of the encryption function Fc, which is identical to the encryption function present in the vehicle Vi; the latter has been stored in the secure area 107 by means of the cardlet software element which includes this encryption function Fc. The formula for R'i is as follows:

$$R'i=Fc(Vidi,M,N)$$

the data element M having been received when RPAi was sent, and the data element N being a data element obtained by the smartphone SP.

If the smartphone SP receives a data frame TD' transmitted by a vehicle Vi' other than that for which a use has been authorized, the first secret code Vidi used to calculate the encrypted check code R'i will give a result (R'i=Fc(Vidi, M', N)) which is different from the encrypted code Ri for the data frame TD' (Ri=Fc(Vidi', M', N')).

Thus, in the first example considered (RPAi=Fc(Vidi)), the first secret code Vidi, which had been communicated to the secure area 107 by means of the accreditation Credentiali, is simply used to perform the calculation of the checking identification data element Ri. Therefore, R'i=Fc(Vidi). The data element Ri and the checking data element R'i will be equal only if the first secret code Vidi stored in the secure storage area is identical to the first secret code Vidi of the vehicle Vi transmitting the data frame TD. If the smartphone SP receives a data frame TD' transmitted by a vehicle Vi' other than that for which a hire has been authorized, the first secret code Vidi used to calculate the checking data element R'i=Fc(Vidi) will give a result which is different from the identification data element Ri=Fc(Vidi') of the data frame TD'.

In the second example considered (RPAi=Rand.CONCAT Fc(Vidi,Rand)), use is made, on the one hand, of the first secret code Vidi communicated to the secure area by means of the accreditation Credentiali, and, on the other hand, of the random data element Rand transmitted in the data frame Td from the vehicle Vi to the smartphone SR The checking identification data element RPA'i is then calculated as follows: RPA'i=Fc(Vidi,Rand). The part Fc(Vidi,Rand) of the identification data element RPAi is compared with the checking data element RPA'i, and they will be equal only if the first secret code Vidi stored in the secure storage area is identical to the first secret code Vidi of the vehicle Vi transmitting the data frame TD, which is the case in the illustrated example. If the smartphone SP receives a data frame TD' transmitted by a vehicle Vi' other than that for which a use has been authorized, the first secret code Vidi used to calculate the checking data element Rpa'i will give a result which is different from the Fc(Vidi,Rand) part of the identification data element Rpai transmitted in the data frame Tdi.

According to the third and fourth exemplary embodiments, for the purpose of obtaining the identification data element RPAi of the vehicle the procedure followed in the smartphone SP is identical to that followed in the second exemplary embodiment to obtain RPA'i, and thus the Fc(Vidi,DATA) part or the Fc(Vidi, DATA', DATA") part of the identification data element RPAi and the checking identification data element RPA'i will be equal only if the first secret code Vidi stored in the secure storage area is identical to the first secret code Vidi of the vehicle Vi transmitting the data frame Td, and if the smartphone SP also contains the data element DATA (in the third example) or DATA' (in the fourth example).

In an alternative embodiment which is not described, the association used previously in the form of a concatenation may be replaced by an obfuscation or a mixing operation.

Thus, by being put into a scanning mode, for scanning all the vehicles capable of exchanging data according to the BLE protocol, the smartphone SP will recognize the vehicle Vi which the user (that is to say, the user of the smartphone concerned) is authorized to use. When this recognition has taken place, the smartphone SP sends a connection request 110 to the vehicle Vi, advantageously still according to the BLE protocol.

At this stage, the exchanges between the smartphone SP and the vehicle Vi have enabled the smartphone SP to identify the vehicle Vi for which it has an authorization, and the two devices, namely the smartphone SP and the vehicle Vi, are in connected mode.

The steps described below must enable the vehicle Vi to authenticate a command sent by the smartphone SP.

When the connection between the smartphone SP and the vehicle Vi has been established, it is preferable to establish a stronger authentication process in the steps of execution of a desired command (locking, unlocking, etc.), since the smartphone SP and the vehicle Vi have not been paired. That is to say, the smartphone SP must associate a response to a challenge from the vehicle Vi with the command request.

In a first embodiment, the challenge is sent by the vehicle Vi once the connection has been established. The smartphone SP responds to it by sending the specific command (locking, unlocking, etc.).

In an advantageous embodiment, the challenge sent by the vehicle is created during the sending of the RPa. The smartphone SP interprets this challenge on the basis of all or some of the RPa that has been sent, and responds to it, as in the preceding case, by sending the specific command (locking, unlocking, etc.).

The authentication process is as follows:
Initially, a command CmdId desired by the user, for example the command "open the vehicle", is sent to a second encryption module present in the secure area 107. This second encryption module HMAC2, of the HMAC type, also receives the identification data element RPAi transmitted by the vehicle Vi and a simplified accreditation code Credential'i which corresponds to the accreditation code Credentiali, previously stored in the secure area 107, in which the information relating to the first secret code Vidi has been removed so that it cannot be disclosed. Finally, the second encryption module receives the signature CredentialMACi of the accreditation code Credentiali, which had also been stored in the secure area 107.

On the basis of this information, the second encryption module calculates a first verification code MAC.

When the verification code MAC has been established, the smartphone SP sends to the vehicle Vi, advantageously still according to the BLE protocol, a request 111 for a command Rc comprising, notably, the simplified accreditation code Credential'i, the desired command CmdID and the first verification code MAC.

On its side, the vehicle Vi performs the same calculations: on the basis of the simplified accreditation code Credential'i, the first secret code Vidi and the second secret code DiversifierKey, it recalculates the authentication code CredentialMACi of the accreditation code Credentiali by means of the first encryption module HMAC1, which is also present in the electronic module 120 of the vehicle Vi. The signature CredentialMACi is then supplied to the second encryption module HMAC2, which is identical to the encryption module of the secure area 107 of; the second encryption module also receives the checking identification data element RPAi, via the command request Rc, the desired command CmdID, and the simplified accreditation code Credential'i, and can thus calculate a second verification code MAC'. If the first verification code MAC and the second verification code MAC' are identical, then the desired command CmId will be executed by the vehicle Vi, provided that the desired command CmId is actually in the list of rights CmdRightsi, and that the moment RealTime at which these verifications take place actually falls within the authorized period of use TSi. In an alternative embodiment, the order of the verifications may be reversed, the method starting by testing the information in clear, Credential'i and CmdID, and then, if and only if these are validated, verifying the authentication codes CredentialMACi and MAC.

In an advantageous embodiment, the vehicle Vi sends a complementary variable Nonce to the smartphone SP in a transmission 112 for the calculation of the verification code MAC. Advantageously, the complementary variable Nonce takes a value which is used once only; any further sending of this complementary variable Nonce by the vehicle Vi will take a different value. The complementary variable Nonce is used by the second encryption module HMAC2 of the secure storage area 107 in the calculation of the verification code MAC, and by the second encryption module HMAC2 of the vehicle Vi for the calculation of the second verification code MAC'. In this way, additional security is provided.

In the invention, secure data exchange is thus provided between a smartphone and a vehicle which exchange data according to the BLE protocol, entirely by means of a simplified process, and there is no need for a user to enter any pairing code.

The invention claimed is:

1. A method for automatic recognition between a mobile electronic device and a motor vehicle equipped with an electronic communication module, said mobile electronic device and the electronic module of the vehicle being capable of operating according to the BLE protocol, the mobile electronic device being in a scanning mode and the electronic communication device of the vehicle being in an advertising mode, the method comprising:
    obtaining an identification data element of the vehicle in the electronic module of the vehicle;
    sending at least one data frame, comprising the identification data element of the vehicle, from the electronic module of the vehicle to the mobile electronic device;
    receiving, in the mobile electronic device which has been put into scanning mode, the at least one data frame containing the identification data element of the vehicle; and
    verifying, in the mobile electronic device, that the transmitted identification data element is valid, and then sending a connection request from the mobile electronic device to the electronic module of the vehicle,
    wherein the identification data element (Rpai) of the vehicle (Vi) is expressed according to the formula $$RPAi=M(ASSOC)Ri,$$

where $Ri=Fc(Vidi,M,N)$
    where
        M and N are variable data elements, of m and n bits respectively, m and n being integers or zeroes;
        Fc is an encryption function;
        Vidi is a secret code of the vehicle Vi; and
        ASSOC is a function which associates data with one another.

2. The automatic recognition method as claimed in claim 1, wherein:
    $m=n=0$.

3. The automatic recognition method as claimed in claim 1, wherein:
    $m=0$
    $n \neq 0$.

4. The automatic recognition method as claimed in claim 1, wherein:
    $m \neq 0$
    $n=0$.

5. The automatic recognition method as claimed in claim 1, wherein:
    $m \neq 0$
    $n \neq 0$.

6. The automatic recognition method as claimed in claim 5, wherein the mobile electronic device calculates, on its side, an encrypted control code according to the formula:

$$R'i=Fc(Vidi,M,N).$$

7. The automatic recognition method as claimed in claim 6, wherein verifying in the mobile electronic device that the transmitted identification data element is valid consists of an equality comparison between Ri and R'i.

8. The automatic recognition method as claimed in claim 1, wherein some or all of the at least one data frame sent from the electronic module of the vehicle to the mobile electronic device is used as a challenge to which the mobile electronic device must respond to perform an action on the vehicle, and the identification data element of the vehicle may or may not vary from one transmission to the next, based on the data.

9. A method for automatic recognition between a mobile electronic device and a motor vehicle equipped with an electronic communication module, said mobile electronic device and the electronic module of the vehicle being capable of operating according to the BLE protocol, the mobile electronic device being in a scanning mode and the electronic communication device of the vehicle being in an advertising mode, the method comprising:
- obtaining an identification data element of the vehicle in the electronic module of the vehicle;
- sending at least one data frame, comprising the identification data element of the vehicle, from the electronic module of the vehicle to the mobile electronic device;
- receiving, in the mobile electronic device which has been put into scanning mode, the at least one data frame containing the identification data element of the vehicle; and
- verifying, in the mobile electronic device, that the transmitted identification data element is valid, and then sending a connection request from the mobile electronic device to the electronic module of the vehicle, wherein the identification data element ($Rpai$) of the vehicle ($Vi$) is expressed according to the formula $$RPAi = M(ASSOC)Ri,$$

where $Ri = Fc(Vidi, M, N)$
where
- M and N are variable data elements, of m and n bits respectively, m and n being integers or zeroes;
- Fc is an encryption function;
- Vidi is a secret code of the vehicle Vi; and ASSOC is a function which associates data with one another, and wherein some or all of the at least one data frame sent from the electronic module of the vehicle to the mobile electronic device is used as a challenge to which the mobile electronic device must respond to perform an action on the vehicle.

* * * * *